United States Patent [19]

Hyder

[11] Patent Number: 4,931,952
[45] Date of Patent: Jun. 5, 1990

[54] TARGET ASSOCIATION METHOD
[75] Inventor: Jerry D. Hyder, Norco, Calif.
[73] Assignee: Hughes Aircraft Company, Los Angeles, Calif.
[21] Appl. No.: 177,258
[22] Filed: Apr. 4, 1988
[51] Int. Cl.⁵ ............................................. G06G 7/78
[52] U.S. Cl. .................................... 364/517; 358/125; 358/126
[58] Field of Search ............... 364/402, 423, 455, 460, 364/516, 517; 358/125, 126, 109

[56] References Cited
U.S. PATENT DOCUMENTS

| | | | |
|---|---|---|---|
| 4,133,004 | 1/1979 | Fitts | 358/125 |
| 4,220,967 | 10/1980 | Ichida et al. | 358/105 |
| 4,364,089 | 12/1982 | Wolfson | 358/125 |
| 4,739,401 | 4/1988 | Sacks et al. | 358/126 |

Primary Examiner—Charles E. Atkinson
Assistant Examiner—S. Kibby
Attorney, Agent, or Firm—William J. Streeter; Wanda K. Denson-Low

[57] ABSTRACT

An improved target association method including the steps of: (a) generating electrical or optical signals representing target detections from an image sensor; (b) storing the signals from a first detection interval in a first memory as a first frame of data; (c) storing the signals from a second detection interval in a second memory as a second frame of data; (d) generating a matrix of cost functions having n rows corresponding to n targets from the first frame of data and m columns corresponding to m targets in the second frame of data, each cost function being a function of one of n targets in a first frame of data and one of m targets in a second frame of data; (e) ordering the rows of the matrix by: (i) computing for each row a value equal to the difference between the two smallest cost functions in the row; (ii) identifying and selecting as an initial starting row, the row with the largest difference value, and removing from consideration for the calculation of difference values for subsequent rows, the column in which the smallest cost function in the row is located; (iii) setting the selected row as the first row in the order; (iv) calculating the difference values for subsequent rows; (v) setting as the next row in the order the row providing the largest difference value of the remaining rows, if the row has a difference value larger than that of any previously selected row, then recomputing the difference values for the previously selected rows removing from consideration for the calculation of the difference values the column in which the smallest cost function in the currently selected row is located; (vi) ordering the selected rows according to difference values; (vii) repeating steps (iv) through (vi) beginning with the last selected row, if the selected row is the last row, then (f) associating, for each row in accordance with the order of the rows, the signal from the target corresponding to the row with the signal from the target corresponding to the column, not previously associated, having the smallest cost function so that each signal corresponding to each target from the first frame of data is optimally associated with a signal corresponding to a single target in the second frame of data.

5 Claims, 3 Drawing Sheets

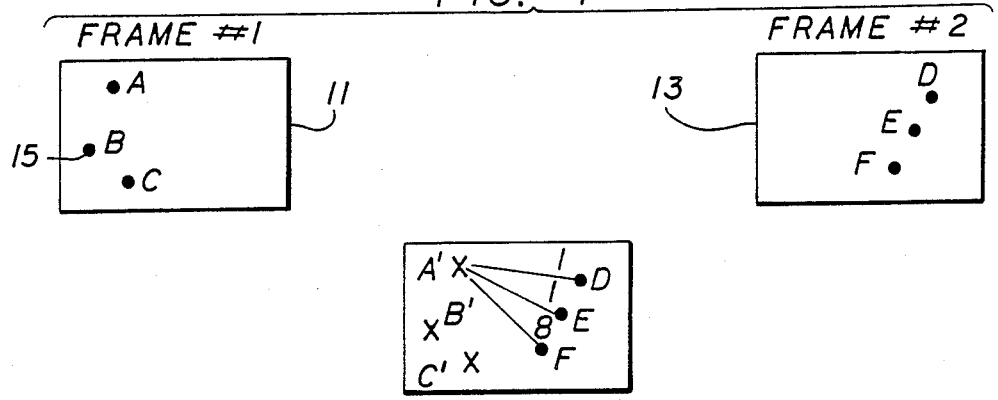
FIG. 1
FIG. 2
FIG. 3
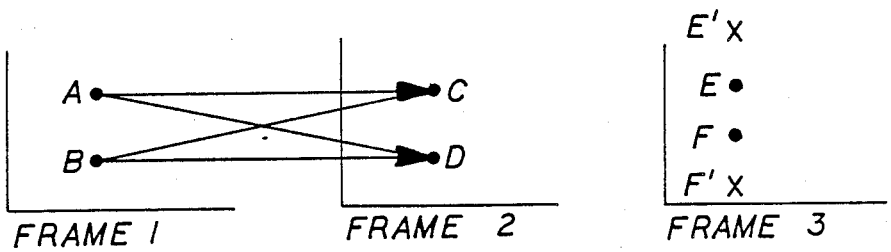
FIG. 6

FIG. 4(a)

|   | A   | B   | C |
|---|-----|-----|---|
| D | 1  0 | 4  | 1 |
| E | 1  1 | 2  | 5 |
| F | 8   | 1  3 | 4 |

FIG. 4(b)

|   | A   | B   | C |
|---|-----|-----|---|
| D | 1  0 | 4  | 1 |
| E | 1  4 | 2  | 5 |
| F | 8   | ①  3 | 4 |

FIG. 4(c)

|   | A   | B   | C |
|---|-----|-----|---|
| D | 1   | 4  | 1  3 |
| E | ①  4 | 2  | 5 |
| F | 8   | 1  3 | 4 |

FIG. 4(d)

|   | A   | B   | C |
|---|-----|-----|---|
| D | 1   | 4  | ①  3 |
| E | ①  4 | 2  | 5 |
| F | 8   | ①  3 | 4 |

FIG. 5(a)

|   | B | C | X |
|---|---|---|---|
| D | 4 | 1  3 | $10^4$ |
| E | 2  3 | 5 | $10^4$ |
| F | 1  3 | 4 | $10^4$ |

FIG. 5(b)

|   | B | C | X |
|---|---|---|---|
| D | 4 | 1  $10^4-1$ | $10^4$ |
| E | 2 | 5  $10^4-5$ | $10^4$ |
| F | ①  3 | 4 | $10^4$ |

FIG. 5(c)

|   | B | C | X |
|---|---|---|---|
| D | 4 | ①  $10^4-1$ | $10^4$ |
| E | 2  $10^4-2$ | 5 | $10^4$ |
| F | 1  $10^4-1$ | 4 | $10^4$ |

FIG. 5(d)

|   | B | C | X |
|---|---|---|---|
| D | 4 | ①  $10^4-1$ | $10^4$ |
| E | 2  $10^4-2$ | 5 | $10^4$ |
| F | ①  $10^4-1$ | 4 | $10^4$ |

TARGET ASSOCIATION METHOD

BACKGROUND OF THE INVENTION

1. Field of the Invention

The present invention relates to image processing techniques. More specifically, the present invention relates to techniques for associating targets or objects in a first frame of data with targets or objects in a second frame of data.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof.

2. Description of the Related Art

Targets and objects representing electro-optical or electromagnetic observations, detections and measurements may be represented as a sequential tabulation of discrete events in two dimensions, along with associated attributes (i.e. intensity). The events are typically represented by a frame of data from a scanning, or periodically sampled staring, sensing system. Each frame of data results from one scan, of a scanning sensor, or one sampling interval for a staring sensor. In any event, the problem is to efficiently associate targets from one frame to targets in another frame. In this context, efficiency is a measure of the speed and accuracy by which the targets may be associated. In general, the number of calculations required by a particular target association technique has a significant impact on the efficiency and power consumption of the technique.

In this connection, there are several significant limitations associated with conventional target association techniques. First, conventional target association techniques typically require too many calculations to be sufficiently fast and efficient to address many demanding contemporary applications. That is, target association from scan to scan is typically performed on the basis of some cost function relating target i of scan N-1 to target j of scan N. For each i,j pair, there is an associated cost $C_{ij}$ (e.g. the mean square error) between the targets. The association that minimizes the total cost $Z = \text{Sum } C_{ij}$, while constraining any association to be one for one, is the desired solution. If there are M targets in each frame, then there are M factorial (M!) possible associations from which to choose the correct target m. Clearly enumeration (the individual calculation of the cost corresponding with each possible association) would be too expensive for more than just a few targets. For example, one current application requires the rapid, efficient and accurate association of approximately 10,000 to 30,000 objects including targets, stars and ground clutter. There is therefore a current need in the art for a fast, accurate and efficient target association technique.

Secondly, conventional techniques do not necessarily provide an optimal solution to a particular target association problem. That is, the required one to one correspondence on the solution set which in turn forces removal and replacement of associated targets, disallows the assumption of convexity. If the feasible solutions were a convex set, one could proceed along the direction of maximum slope from basic feasible solution to basic feasible solution until an optimum solution was achieved. However, this procedure fails where the solution sets are not convex, i.e. have local extremals. There is therefore a further need in the art for a target association technique that more frequently provides an optimal solution than conventional techniques.

Finally, conventional techniques are typically too theoretical and general with no practical constraints to be of practical utility for a particular application. While these techniques may provide for accurate association, they often assume no practical constraints with respect to time, memory, number of targets etc. There is therefore a need in the art for an accurate, practical, efficient, fast and reliable target association technique.

The need in the art is addressed by the improved target association method of the present invention. The method of the invention includes the steps of:

(a) generating electrical or optical signals representing target detections from an image sensor;

(b) storing the signals from a first detection interval in a first memory as a first frame of data;

(c) storing the signals from a second detection interval in a second memory as a second frame of data;

(d) generating a matrix of cost functions having n rows corresponding to n targets from the first frame of data and m columns corresponding to m targets in the second frame of data, each cost function being a function of one of n targets in a first frame of data and one of m targets in a second frame of data;

(e) ordering the rows of the matrix by:

(i) computing for each row a value equal to the difference between the two smallest cost functions in the row;

(ii) identifying and selecting as an initial starting row, the row with the largest difference value, and removing from consideration for the calculation of difference values for subsequent rows, the column in which the smallest cost function in the row is located;

(iii) setting the selected row as the first row in the order;

(iv) calculating the difference values for subsequent rows;

(v) setting as the next row in the order the row providing the largest difference value of the remaining rows, if the row has a difference value larger than that of any previously selected row, then recomputing the difference values for the previously selected rows removing from consideration for the calculation of the difference values the column in which the smallest cost function in the currently selected row is located;

(vi) ordering the selected rows according to difference values;

(vii) repeating steps (iv) through (vi) beginning with the last selected row, if the selected row is the last row, then (f) associating, for each row in accordance with the order of the rows, the signal from the target corresponding to the row with the signal from the target corresponding to the column, not previously associated, having the smallest cost function so that each signal corresponding to each target from the first frame of data is optimally associated with a signal corresponding to a single target in the second frame of data.

The limitations of conventional targets association techniques are addressed by the improved target association technique of the present invention.

The improved target association method of the present invention includes the steps of:

(a) generating a matrix of cost functions having n rows corresponding to n targets from a first frame of data and m columns corresponding to m targets in a second frame of data, each cost function being either a function of one of n targets in a first frame of data and one of m targets in a second frame of data, or a dummy value;

(b) ordering the rows of said matrix by:

(i) computing for each row a value equal to the difference between the two smallest cost functions in the row;

(ii) identifying and selecting as an initial starting row, the row with the largest difference value, and removing from consideration for the calculation of difference values for subsequent rows, the column in which the smallest cost function in said row is located;

(iii) setting as the first row in said order said first selected row;

(iv) calculating the difference values for subsequent rows;

(v) setting as the next row in said order the row providing the largest difference value of the remaining rows, if the row has a difference value larger than that of the initial starting row, then selecting, as a new first row, the row with the largest difference value, replacing the previously removed columns, removing, from subsequent calculations to obtain the difference values for subsequent rows, the column in which the smallest cost function in said row is located and returning to step iii) to begin a new pass through said matrix, otherwise;

(vi) removing the column in said next row in which said smallest cost function is located and (iv) repeating steps v-vi until said n rows have been ordered; then (c) associating, for each row in accordance with said order of said rows, the target corresponding to the row with the target corresponding to the column, not previously associated, having the smallest cost function so that each target from said first frame of data is optimally associated with a single target in said second frame of data.

BRIEF DESCRIPTION OF THE DRAWINGS

FIG. 1 illustrates typical first and second frames of data such as that provided by an electro-optical scanner.

FIG. 2 illustrates the overlay of the first frame of data over the second frame of data to generate cost functions between the targets therein.

FIG. 3 shows a typical matrix of cost functions.

FIGS. 4(a)-4(d) illustrate how the matrix of cost functions are processed in accordance with the method of the present invention to optimally associate targets from the first frame with those of the second frame.

FIGS. 5(a)-5(d) provide another illustration of how the matrix of cost functions are processed in accordance with the method of the present invention to optimally associate targets from the first frame with those of the second frame.

FIG. 6 illustrates how the target association method of the present invention may be used to resolve frame to frame ambiguities.

DESCRIPTION OF THE INVENTION

FIG. 1 shows first and second frames of data, 11 and 13 respectively, such as that typically provided by a conventional scanning sensor (not shown). Within frame 11 are n targets 15 of which 3 are shown A, B, and C. Within the subsequent frame 13 are m targets, objects or clutter D, E, and F. The above noted target association problem arises when the second frame of data 13 is generated and the targets 15 have been relocated within the frame 13. Target relocation may be due to a number of factors including target movement, errors in the system pointing accuracy, the presence of clutter etc. Thus, the problem is to identify or associate the original targets A, B, and C in frame 11 with targets D, E, and F in frame 2.

The target association process begins with the comparison of the first frame of data 11 with the second frame of data 13. As shown in FIG. 2, the data points (representing targets, objects, or clutter) of the first frame 11 are compared to those of the second frame 13. A metric is generated between each point in the first frame 11 and each point in the second frame 13. The metric may be the euclidean distance between each data point weighted by other parameters as is known in the art. The metric provides a cost function which is useful in providing an optimal target association between frames. For example, the distance or cost function between data point A of the first frame 11 (represented by an 'x' as A' in FIG. 2) and data point D of the second frame 13 is shown as '1'. Similarly, the cost functions for A'E and A'F are '1' and '8' respectively. The corresponding values are generated for B' and C' relative to data points D, E, and F to provide an n×m matrix 17 as shown in FIG. 3. The elements of the matrix 17 are the cost functions 19 corresponding to the n targets of the first frame 11 (which provide the n columns of the matrix 17 A, B, and C, where n=3) and the m targets of the second frame 13 (which provide the m rows of the matrix 17 D, E, and F, where m=3). Note that m should be greater than or equal to n.

The typical conventional target association technique involves the association of the target corresponding to a row with the target corresponding to the column in which the lowest cost function is located in the chosen row. Since the technique provides a one to one correspondence, cost functions in columns previously selected for association must be removed or eliminated from consideration with respect to rows subsequently considered. Thus, as is well known in the art, the target association solutions provided by typical conventional techniques vary depending on the order of the rows (targets) selected for association.

For example, and with reference to the matrix of FIG. 3, if the order of association were first row D, then row E, then row F, target D would be associated with target A or C, target E would be associated with target B or A and target F would be associated with target C or B. If, however, the order of association were row F, then row E, then row D, target F would be associated with target B, target E would be associated with target A and target D would be associated with target C. This is the optimal solution. (Note that this solution would be unaffected by starting with row E.)

It is clear that the key to efficiently providing an optimal solution is to select the correct order of association. The method of the present invention improves on the above-described conventional technique by providing the correct order of association early in the processing scheme to allow for fast, efficient target association.

As illustrated in FIG. 4(a) the method of the present invention achieves an ordering the rows of the matrix by computing for each row a value equal to the difference between the two smallest cost functions in the row. Next, the row with the largest difference value is identified and selected as an initial starting row. The column, in which the smallest cost function in the selected row is located, is removed from consideration for the calculation of difference values for subsequent rows. The selected row is set as the first row in the order. The rows are supplemented with dummy values, much much larger than the largest cost function in the matrix, as necessary to provide a difference value for each row. Next, the difference values for the subsequent rows are calculated and the row providing the largest difference value is set as the next row in the order. If the row has a difference value larger than that of any previously selected row, then the difference value for the previously selected row is recomputed after removing from consideration, for the calculation of the difference values, the column in which the smallest cost function in the currently selected row is located. Next, the selected rows are ordered according to difference values. The difference values for the subsequent rows are calculated and the above steps are repeated until the last row is ordered. Finally, the target corresponding to the row, for each row in accordance with this order of rows, is associated with the target corresponding to the column, not previously associated, having the smallest cost function in the row so that each target from said first frame of data is optimally associated with a single target in said second frame of data.

To illustrate the advantageous target association method of the present invention, reference is made to the illustrative example of FIG. 4(a). In accordance with the present invention, a difference value is obtained for each row equal to the difference between the two smallest cost functions in the row. For row D corresponding to target D of the second frame 13, the two smallest cost functions are '1' and '1' corresponding to targets A and C respectively. The difference between these two cost functions of zero is obtained for the row D and, for illustration, is placed in the lower right hand corner of the column which is noted as having smallest cost function in the row, in this case either column A or column C. Similarly, a difference value of 1 is obtained for row E column A and a difference value of 3 is obtained for row F column B. Clearly, the difference value of 3 for row F is larger than that for either row D or row E. Row F is therefore chosen as the starting row for the next pass through the matrix. Column B is removed and the difference values are recomputed for the remaining rows.

As shown in FIG. 4(b), the difference value of 4 for row E column A is larger than the value of 3 for the starting row. Accordingly, row E is chosen as the new starting row in the matrix, column B is replaced and column A is removed for the purpose of recalculating the difference values for rows D and F. As shown in FIG. 4(c), new difference values are obtained for the previously selected row, row F. This difference value, 3, is smaller than the value of 4 for row E. Thus, row E is the correct starting row. Since the difference values of 3 for rows D and F are equal, the optimal target association is D and C, E and A, and F and B. This solution is the optimal solution having the minimal total cost of $z = 1 + 1 + 1 = 3$.

FIGS. 5(a)-5(d) illustrate the operation of the present invention in applications where there is a disparity in number of targets between frames. As shown in FIG. 5(a), the problem is to associate targets B and C from a first frame with targets D, E and F from a second frame. As there are only two columns, a third dummy column X is added. Each of the elements in the dummy column is set at $10^4$, much much higher than any of the actual elements. The dummy elements are used to provide difference values for each row. For example, assume that the third row F is initially identified as a starting row with a difference value of 3 in column B. See FIG. 5(b). The difference values for rows D and E would be $10^4 - 1$ and $10^4 - 5$ respectively. Since $10^4 - 1$ is the largest difference value, row D is identified as the optimal starting row. The values for column B are replaced, the values for column C are removed and new difference values are computed using the dummy elements. See FIG. 5(c). Since the difference value for row F column B is larger than that for row E column B, target F is optimally associated with target B while target D is optimally associated with target C. There is no solution for row E. The solution has a total cost of 2.

The target association method of the present invention minimizes the number of required operations by first packing the association candidates according to some given maximum allowable cost (gate) and then ordering the reduced number of candidates according to the related costs. Association candidates exceeding the cost gate are ignored. The solution is then pursued along an optimal path. No unnecessary ordering is required as ordering is performed only on an as needed basis.

The technique of the present invention may be used to resolve frame to frame ambiguities such as illustrated in FIG. 6. That is, in associating targets A and B of frame 1 with targets C and D of frame 2, there is an ambiguity in that target A moving at an angle may be properly associated with target D in frame 2 instead of target C. Likewise, target B of frame 1 could be target D or target C of frame 2 depending on its movement within the scanner field of view between frames. The ambiguities are identified, indeed arise, when the cost functions for associations between frames 1 and 2 are close in value. For example, of FIG. 6, ambiguities would be identified when the 'AC' association is approximately equal to the 'BD' association and the 'AD' association is approximately equal to the 'BC' association. The technique of the present invention may be extended to address this ambiguity by considering a third frame of data. If the two targets are at E and F then it can be assumed that target A associates with targets C and E while target B associates with targets D and F. If, however, targets exist at E' and F' in the third frame of data, that is, their cost functions are large relative to those obtained with reference to the first and second frames of data, target A may be associated with targets D and F' while target B may be associated with targets C and E'.

Thus, the present invention has been described with reference to particular embodiments for particular applications. Those having ordinary skill in the art and access to the teachings provided herein will recognize additional modifications, applications and embodiments within the scope thereof. It is intended by the appended claims to cover any and all such modifications, applications, and embodiments.

Accordingly,

What is claimed is:

1. An improved target association method including the steps of:
   (a) generating electrical or optical signals representing target detections from an image sensor;

(b) storing said signals from a first detection interval in a first memory as a first frame of data;

(c) storing said signals from a second detection interval in a second memory as a second frame of data;

(d) generating a matrix of cost functions having n rows corresponding to n targets from said first frame of data and m columns corresponding to m targets in said second frame of data, each cost function being a function of one of n targets in a first frame of data and one of m targets in a second frame of data;

(e) ordering the rows of said matrix by:
  (i) computing for each row a value equal to the difference between the two smallest cost functions in the row;
  (ii) identifying and selecting as an initial starting row, the row with the largest difference value, and removing from consideration for the calculation of difference values for subsequent rows, the column in which the smallest cost function in said row is located;
  (iii) setting said selected row as the first row in said order;
  (iv) calculating the difference values for subsequent rows;
  (v) setting as the next row in said order the row providing the largest difference value of the remaining rows, if the row has a difference value larger than that of any previously selected row, then recomputing the difference values for the previously selected rows removing from consideration for the calculation of said difference values the column in which the smallest cost function in the currently selected row is located;
  (vi) ordering the selected rows according to difference values;
  (vii) repeating steps (iv) through (vi) beginning with the last selected row, if the selected row is the last row, then (f) associating, for each row in accordance with said order of said rows, said signal from the target corresponding to the row with said signal from the target corresponding to the column, not previously associated, having the smallest cost function so that each signal corresponding to each target from said first frame of data is optimally associated with a signal corresponding to a single target in said second frame of data.

2. The improved target association method of claim 1 including the step of associating signals from targets in a third frame with said signals from said targets in said second frame to resolve ambiguities in the association of targets in said first frame with targets in said second frame.

3. The improved target association method of claim 2 including the step of adding one or more columns of dummy cost functions to said matrix.

4. The improved target association method of claim 1 including the step of gating said cost functions prior to generating said matrix.

5. The improved target association method of claim 1 including the step of adding one or more columns of dummy cost functions to said matrix.

* * * * *